May 20, 1941.  W. J. McCLENAHEN  2,242,790
BRAKE MECHANISM
Filed Jan. 20, 1938
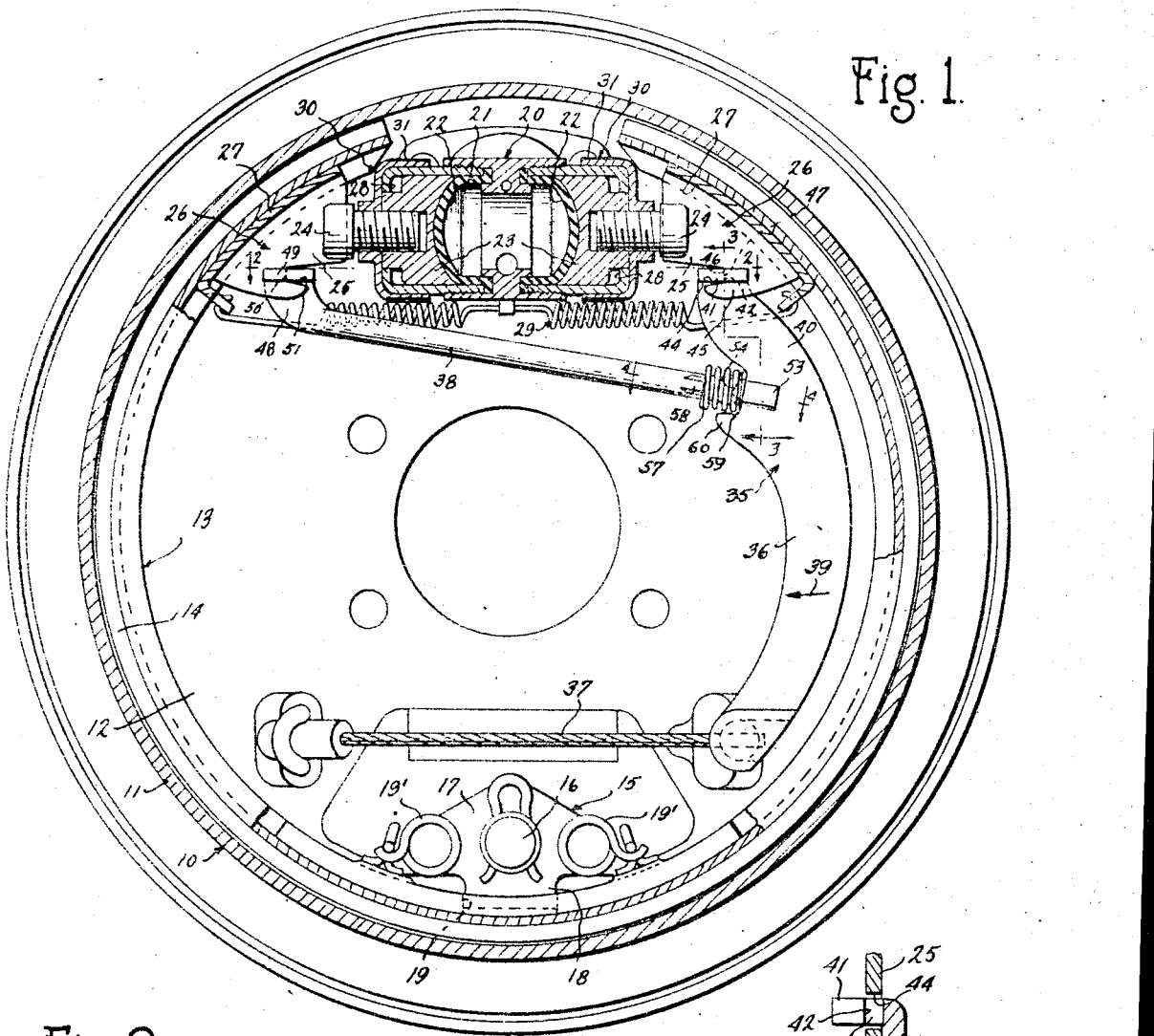
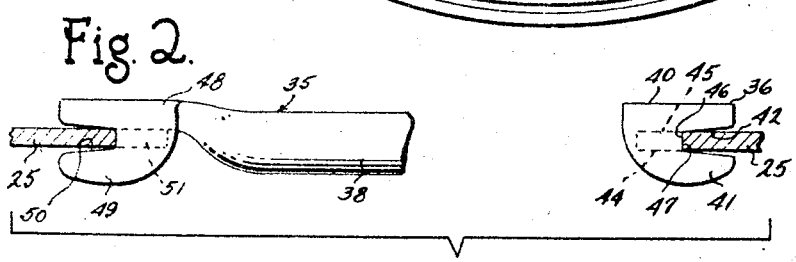
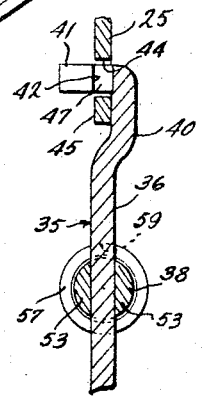
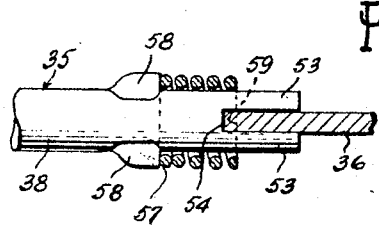
INVENTOR.
Wright J. McClenahen
BY
ATTORNEYS Patented May 20, 1941

2,242,790

UNITED STATES PATENT OFFICE 2,242,790

BRAKE MECHANISM

Wright J. McClenahen, Dearborn, Mich., assignor to Kelsey-Hayes Wheel Company, Detroit, Mich., a corporation of Delaware Application January 20, 1938, Serial No. 185,958

8 Claims. (Cl. 188—78)

This invention relates generally to vehicle brakes and refers more particularly to improvements in the construction of the actuating mechanism for the brake friction means.

It is one of the principal objects of the present invention to provide a vehicle brake with an improved actuating mechanism composed of a relatively few simple parts capable of being inexpensively manufactured, assembled, and installed.

Another advantageous feature of this invention which contributes materially to reducing the cost and simplifying assembly of the brake consists in the provision of a mechanical actuator provided with an operating lever having one end freely pivotally connected to the friction means adjacent one end of the latter and provided with a link having the opposite ends respectively freely pivotally connected to the adjacent end of the friction means and to the operating lever intermediate the ends of the latter.

Still another object of this invention resides in the provision of an actuator wherein the free connections referred to in the preceding paragraph are such as to permit the required movement of the ends of the friction means into engagement with the drum and to provide for adjusting the friction means relative to the drum without any danger of the parts of the actuating mechanism becoming disengaged from each other or the friction means.

The foregoing, as well as other objects, will be made more apparent as this description proceeds, especially when considered in connection with the accompanying drawing, wherein—

Figure 1 is a side elevational view of a brake construction having certain parts broken away for the sake of clearness;

Figure 2 is a sectional view taken substantially on the plane indicated by the line 2—2 of Figure 1;

Figure 3 is a sectional view taken substantially on the plane indicated by the line 3—3 of Figure 1; and Figure 4 is a sectional view taken substantially on the plane indicated by the line 4—4 of Figure 1.

For the purpose of illustrating the present invention, I have selected a band type brake construction having two completely independent brake operators for actuation respectively by the service pedal and the emergency brake lever or their equivalents. It will also be noted that in the brake selected for the purpose of illustration, the actuator under control of the service pedal is of the hydraulic type, whereas, the actuator independently operated by the emergency lever is of the mechanical type. However, it will become apparent as this description proceeds that the invention is not limited to band type brakes, nor is it restricted to the use of a hydraulic actuator for applying the service brake.

In detail, the brake shown in the drawing comprises a revoluble brake drum 10 having an annular brake flange 11 and having a backing plate 12 fixed against rotation with the drum at the inboard side of the flange. The brake friction means is shown in Figure 1 as being in the form of a band 13 supported on the backing plate within the drum and having a friction lining 14 on the exterior surface thereof for engaging the brake flange 11 of the drum. In the present instance, the brake band 13 is anchored intermediate the ends thereof to the backing plate 12 through the medium of a centering device 15 comprising a stud 16 and a bell crank 17. The stud 16 is mounted on the backing plate and the bell crank 17 is mounted for limited oscillation about the axis of the stud and is provided with an arm 18 extending into a slot 19 formed in the band 13 intermediate the ends thereof. The bell crank 17 is normally held in a neutral position wherein the band is centered in the brake drum by means of the action of the springs 19' located on opposite ends of the arm 18 of the bell crank.

Upon referring again to Figure 1, it will be noted that the ends of the band are spaced from each other circumferentially of the brake flange 11 and that two independent actuators are provided between said ends for expanding the brake friction lining 14 on the band into engagement with the brake flange 11 of the drum. The actuator, designated by the reference character 20, is of the hydraulic type and, in the present instance, is shown as similar in construction to the one described in the John William White Patent No. 1,999,675, dated April 30, 1935. In general, the hydraulic actuator comprises a chamber 21 communicating with a source of fluid under pressure (not shown) and having opposed flexible end walls in the form of diaphragms 22 for actuating the pistons 23 which, in turn, are connected to the free ends of the brake band. The connection between each piston 23 and the adjacent end of the band is effected by means of a stud 24 having a threaded shank portion extending freely into a recess formed in the outer end of the piston and having a head portion provided with a radial slot therein for receiving the adjacent edge of a web 25 extending radially inwardly from the brake band. In the present instance, the webs 25 form parts of brackets 26 having the base portions 27 welded, or otherwise permanently secured, to the inner surfaces of the adjacent ends of the brake band.

With the above construction, it will be noted that when pressure is built up in the chamber 21 between the adjacent sides of the pistons 23, the latter are moved outwardly relative to the cylinder 28 and effect a corresponding movement of the adjacent ends of the brake band into engagement with the annular brake flange 11 on the drum. The adjacent ends of the brake band are moved outwardly into engagement with the brake flange by the hydraulic actuator 20 against the action of the spring 29 having the opposite ends respectively connected to the adjacent ends of the band. This spring 29 acts to return the brake band to its released position in the drum when the pressure in the chamber 21 is relieved.

It has previously been stated that the threaded shank portions of the studs freely engage in recesses formed in the outer ends of the pistons 23 and, in the present instance, each stud is held in assembled relationship with its associated piston by means of a nut 30 abutting the outer end of the latter piston. The nuts 30 are threadedly engaged with the shank portions of the studs and are formed with annular flanges 31 which extend over the opposite ends of the cylinder 28. The flanges are provided with angularly spaced serrations to provide for turning the nuts relative to the cylinder 28. Inasmuch as the studs are prevented from rotation by engagement of the head portions thereof with the webs 25 on the brackets 26, it follows that rotation of the nuts in one direction causes the studs to move outwardly relative to the pistons 23 and to position the brake friction means 14 on the band in closer relationship to the annular brake flange 11. Thus, it will be observed that the clearance between the brake lining 14 on the brake band and the annular brake flange 11 on the drum may be accurately adjusted by manipulating the nuts 30. The other actuator for the brake band is of a mechanical type and is designated in Figure 1 by the reference character 35. The mechanical actuator 35 is shown in the above figure as including a lever 36 having one end freely pivotally connected to one end of the brake band for swinging movement in a plane parallel to the plane of rotation of the drum and having the other end operatively connected to the usual brake actuating cable 37. The other end of the brake band is connected to the lever 36 intermediate the ends of the latter by means of a link 38 so that swinging movement of the lever 36 by the cable 37 in the direction of the arrow 39 imparts a spreading action to the adjacent ends of the brake band and serves to expand the latter into engagement with the brake flange 11 of the drum.

As stated above, the brake operating lever 36 is freely pivotally connected to one end of the brake band and this is also true of the connections at opposite ends of the link 38, with the result that the mechanical actuator may be assembled in the minimum length of time. In detail, the end of the lever 36 connected to the brake band is axially offset in a rearward direction in the manner indicated by the reference character 40 and terminates in an axially forwardly projecting flange 41 having an outwardly opening slot 42 in the outer side edge thereof. The width of the slot 42 in the flange 41 is predetermined in dependence upon the thickness of the web 25 extending radially inwardly from the adjacent end of the brake band and is adapted to slidably receive a portion of the web in the manner shown in Figure 2. In this connection, attention is also called to the fact that the aforesaid web 25 is formed with an inwardly opening slot 44 in the inner edge thereof and that this slot is adapted to freely receive the flange 41 on the lever 36. As shown in Figure 1, slotting the web 25 in the manner stated provides an inwardly extending projection 45 at the inner side of the flange 41, and this projection cooperates with the inner wall 46 of the slot 44 to prevent displacement of the lever 36 relative to the band in the direction of length of the lever. The axially spaced side walls of the slot 42 in the flange 41 cooperate with the web to prevent axial displacement of the lever 36 relative to the brake drum.

With the above construction, it will be noted that the lever 36 may be readily assembled with the brake band by merely a sliding motion with the lever relative to the associated web 25 on the brake band. Attention may be called to the fact at this time that the bottoms 47 of the two slots, previously described, engage each other and provide a fulcrum about which the lever 36 is adapted to swing under the action of the brake cable 37.

The end 48 of the link 38 is similarly freely pivotally connected to the web 25 on the other end of the brake band. As shown, the end 48 of the link is formed with a substantially axially extending flange 49 having an outwardly opening slot 50 in the outer edge for receiving a portion of the adjacent web 25 on the brake band. The inner edge of this web 25 is formed with an inwardly opening slot 51 freely receiving a portion of the flange 49 on the end 48 of the link. As in the above described connection, the slot 51 in the web extends in a plane parallel to the plane of rotation of the drum, and the slot 50 in the flange 49 on the link extends in a plane at right angles to the plane aforesaid, with the result that the connection functions in the same manner as the connection previously described to freely connect the end 48 of the link with the band.

The opposite end of the link 38 is bifurcated and a portion of the lever 36 intermediate the ends thereof extends between the furcations 53. The inner edge 54 of the portion of the lever 36 extending between the furcations 53 engages the end portion of the link between the furcations and is arcuate to effect a locking engagement in a plane parallel to the plane of rotation of the drum.

From the foregoing, it will be noted that each of the free connections involved in the mechanical brake mechanism is effected without the use of fastener elements by merely sliding the several parts into engagement with each other. It will also be noted that the construction is such that relative movement of the parts into engagement with each other effects free interlocking connections therebetween capable of the pivotal action required to effectively operate the brake band.

In order to insure maintaining the parts of the mechanical brake in assembled relationship to take up any play that may be present in the connections, I provide a coil spring 57 around the portion of the link 38 adjacent the furcations 53. The coil spring 57 is placed under compression with one end engaging suitable ears 58 projecting laterally from opposite sides of the link and with the other end seated in a recess 59 formed in the lever 36 by the portions 60 of the lever. With this arrangement, it will be noted that the coil spring 57 also maintains the outer ends of the link 38 and lever 36 into frictional engagement with the adjacent ends of the brake band when the latter is expanded by the hydraulic actuator, or when it is adjusted to reduce the clearance between the brake lining 14 and brake flange.

What I claim as my invention is:

1. In brake mechanism, a brake drum, brake friction means supported within the drum for engagement with the latter and having spaced ends provided with radially inwardly extending web portions, actuating means for the brake friction means including a lever having a transverse portion at one end slotted to receive a portion of the web at one end of the friction means with the bottom of the slot abutting a portion of the inner edge of said web to provide a fulcrum for the lever, said last mentioned web having portions extending at the radially inner and outer sides of the transverse end portion of the lever to prevent displacement of the latter relative to the friction means, and a link having a transverse portion slotted to receive the web on the other end of the friction means with the bottom of the slot engaging a portion of the inner edge of the web to provide a fulcrum for the link, said last named web also having portions extending along the radially inner and outer sides of the transverse portion of the link to maintain the latter in assembled relation with the friction means, the opposite end of the link abutting the inner edge of the lever at a point intermediate the ends of the latter and having portions extending along opposite sides of said lever.

2. In brake mechanism, a brake drum, brake friction means supported within the drum for engagement with the latter and having spaced ends provided with radially inwardly extending web portions, actuating means for the brake friction means including a lever having a transverse portion at one end slotted to receive a portion of the web at one end of the friction means with the bottom of the slot abutting a portion of the inner edge of said web to provide a fulcrum for the lever, said last mentioned web having portions extending at the radially inner and outer sides of the transverse end portion of the lever to prevent displacement of the latter relative to the friction means, a link having a transverse portion slotted to receive the web on the other end of the friction means with the bottom of the slot engaging a portion of the inner edge of the web to provide a fulcrum for the link, said last named web also having portions extending along the radially inner and outer sides of the transverse portion of the link to maintain the latter in assembled relation with the friction means, the opposite end of the link abutting the inner edge of the lever at a point intermediate the ends of the latter and having portions extending along opposite sides of said lever, and a compression spring surrounding the latter end portion of the link with one end abutting the inner edge of the lever and with the opposite end abutting shoulders on said link.

3. In brake mechanism, a brake drum, brake friction means supported within the drum for engagement with the latter and having spaced ends, actuating means for the brake friction means located between said ends and effective to move the latter outwardly into engagement with the brake drum, a second actuator for the brake friction means including a lever having one end freely pivotally connected to one end of the friction means, a link having one end freely pivotally connected to the other end of the friction means and having the opposite end pivotally connected to the lever intermediate the ends of the latter, and yieldable means acting to maintain the freely pivotal connections aforesaid into engagement during movement of the brake friction means into engagement with the drum by the first named actuator.

4. In brake mechanism, a brake drum, brake friction means supported within the drum for engagement with the latter and having spaced ends, an actuator located between the spaced ends and acting upon the latter to move the friction means into engagement with the drum, a second actuator for the brake friction means including a lever having one end freely pivotally and slidably connected to one end of the friction means, a link having the opposite ends respectively freely pivotally and slidably connected to the other end of the friction means and to the lever intermediate the ends of the latter, and a spring located under compression between the link and lever urging the latter elements in directions to maintain the connections between the latter and brake friction means by the first named actuator.

5. In brake mechanism, a brake drum, brake friction means supported within the drum for engagement with the latter and having spaced ends, means located between the spaced ends for adjusting the brake friction means to vary the clearance between the latter and brake drum, actuating means for the brake friction means including a lever having one end freely pivotally and slidably connected to one end of the friction means, a link having one end freely pivotally and slidably connected to the other end of the friction means and having the opposite end pivotally connected to the lever intermediate the ends of the latter, and yieldable means acting to urge the slidable connections into pivotal engagement during adjustment of the brake friction means.

6. In brake mechanism, a brake drum, brake friction means supported within the drum for engagement with the latter and having spaced ends, means located between the spaced ends for adjusting the brake friction means to vary the clearance between the latter and brake drum, an actuator also located between said ends for moving the brake friction means outwardly into engagement with the drum, a second actuator for the brake friction means including a lever having one end freely pivotally and slidably connected to one end of the friction means, a link having one end freely pivotally and slidably connected to the other end of the friction means and having the opposite end pivotally connected to the lever intermediate the ends of the latter, and yieldable means for maintaining the slidable connections during adjustment of the friction means and during actuation of the friction means by the first named actuator.

7. In brake mechanism, a brake drum, brake friction means supported within the drum for engagement with the latter and having spaced ends provided with radially inwardly extending web portions, actuating means for the brake friction means including a lever having a portion at one end extending at substantially right angles to the radially extending web portion at one end of the friction means and slotted to receive a portion of the latter end of said web with the bottom of the slot abutting the edge portion of said end to provide a fulcrum for the lever, said last named web having portions extending at the radially inner and outer sides of the right angular end portion of the lever to prevent displacement of the latter relative to the friction means, and a link having one end freely pivotally connected to the lever intermediate the ends thereof and having the other end freely pivotally connected to the other of said web portions.

8. In brake mechanism, a brake drum, brake friction means supported within the drum for engagement with the latter and having spaced ends provided with radially inwardly extending web portions, actuating means for the brake friction means including a lever having a portion at one end extending at substantially right angles to the radially extending web portion at one end of the friction means and slotted to receive a portion of the latter end of said web with the bottom of the slot abutting the edge portion of said end to provide a fulcrum for the lever, said last named web having portions extending at the radially inner and outer sides of the right angular end portion of the lever to prevent displacement of the latter relative to the friction means, and a link having a portion at one end extending at substantially right angles to the web portions and slotted to receive the web on the other end of the friction means with the bottom of the slot engaging a portion of the inner edge of the latter web to provide a fulcrum for the link, said last named web also having portions extending along the radially inner and outer sides of the right angular end portion of the link to maintain the latter in assembled relation with the friction means, and a slidable connection between the opposite end of the link and the lever intermediate the ends of the latter.

WRIGHT J. McCLENAHEN.